Sept. 27, 1960 W. L. BULKLEY ET AL 2,953,963
COMPARISON COLORIMETER
Filed March 19, 1954 3 Sheets-Sheet 2

INVENTORS:
William L. Bulkley
John Robert Krebs
BY
Everett A. Johnson
ATTORNEY

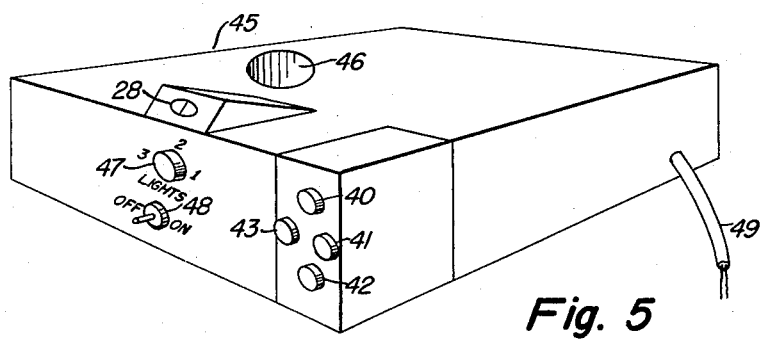
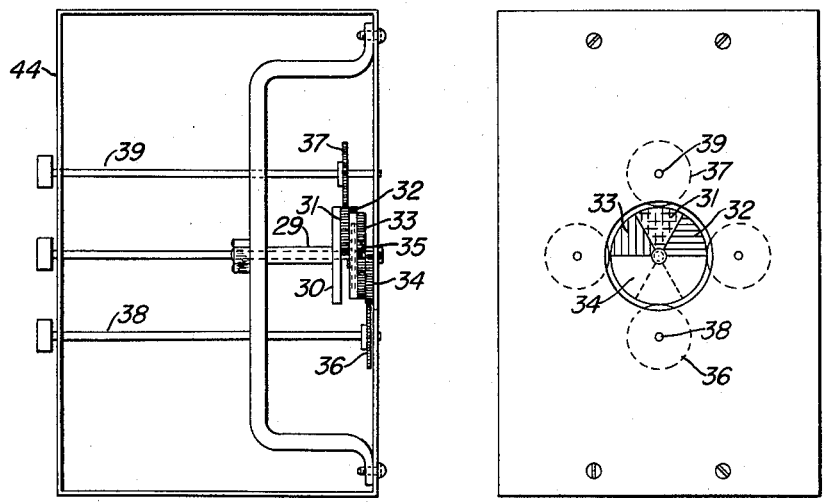
Fig. 5
Fig. 4
Fig. 3

United States Patent Office 2,953,963
Patented Sept. 27, 1960

2,953,963
COMPARISON COLORIMETER

William L. Bulkley, Munster, Ind., and John Robert Krebs, Chicago, Ill., assignors to Standard Oil Company, Chicago, Ill., a corporation of Indiana Filed Mar. 19, 1954, Ser. No. 417,452

5 Claims. (Cl. 88—14)

This invention relates to colorimeters and has particular reference to new and improved colorimeters for comparing the color of translucent substances with certain opaque substances.

Control of color is important in many manufacturing operations and a large variety of instruments have been developed. However, in the case of candle manufacture, the problem of color control is unique. Candles are made by two basic methods, casting or dipping. In either case, the color of the finished product differs from that of the liquid wax from which it was made. Likewise, color may vary with the crystal structure of the paraffin wax in the two types which depends upon the method and temperature of production. The dipped candles usually have a core which is different in color from the exterior layer. It has been found that this core influences the apparent candle color. For proper customer acceptance of the candles, it is necessary that the candles of a given color have a high degree of color uniformity from lot to lot as well as within a single lot. In view of the manufacturing variables, the requisite color control can only be obtained by examination of the finished candle. Heretofore, uniformity of color has been attempted by a simple visual comparison using standard color specimens of different types. However, a given candle wax sample will have one apparent color when exposed only to reflected light as, for example, when packaged, and a different apparent color when it is exposed to both reflected and transmitted light as when it is in a candle holder.

It is, therefore, an object of our invention to provide a new and improved instrument wherein a body of translucent material, such as a candle, may be placed under test quickly and easily. A more specific object of the invention is to provide a new and improved means whereby a candle can readily be placed under test for color comparison. A further object of the invention is to provide an apparatus adapted to compare an opaque color standard such as the Ostwald System color chips in the Container Corporation of America's Color Harmony Manual, 1948 Edition, under reflected light with a translucent sample exposed to both reflected and transmitted light.

Heretofore, a large number of color discs have been necessary in order to obtain the close color definition required. For example, it has been estimated that thirteen thousand separate color chips are necessary to cover the normal range of commercial interest, while more than ten million would be required to represent the complete spectrum of colors with the small limits of variation to which the human eye is sensitive. It is, however, an object of this invention to provide a system which eliminates the many individual color wheels formerly required and to provide a system wherein a minimum of individual color standards may be mechanically blended to produce a wide range of standards.

When the colors of candles are compared with opaque color standards, the surface variations in the candles have made accurate color comparisons difficult. It is, therefore, an important object of our invention to provide a system wherein such surface variations and surface effects of apparent color are minimized. These and other objects of the invention and the advantages of our apparatus will become apparent as the detailed description thereof proceeds.

Briefly, we attain the objects of our invention by providing a means for exposing a section of a candle to both transmitted and reflected light. An apparatus employing this general principle is illustrated in the several figures of the drawings wherein:

Figures 3 and 4 are, respectively, a rear elevation view and a side elevation view, with parts removed, of a segmented color standard unit; and Figure 5 is a perspective of one type of casing adapted for use with our apparatus.

Briefly, according to our invention we expose a translucent sample to both transmitted and reflected light while exposing an opaque color standard to reflected light of similar intensity and position. A first rotating mirror blends the color standard and a second similar mirror blends the candle surface into a single sensation. Standard color chips cut in the shape of sectors of a circle are attached to the face of a disc and relative areas of the color sectors on the color disc are adjusted. The system mechanically blends color standards to obtain greater color discrimination than is possible even within the limits of the most comprehensive color system now available. This permits the close color definition required in candle practice. In addition, the blending technique requires fewer color standards to cover the range of commercial interest. Likewise, the rotated mirror system reduces the candle surface texture effect on the color comparison being made.

Figure 1:
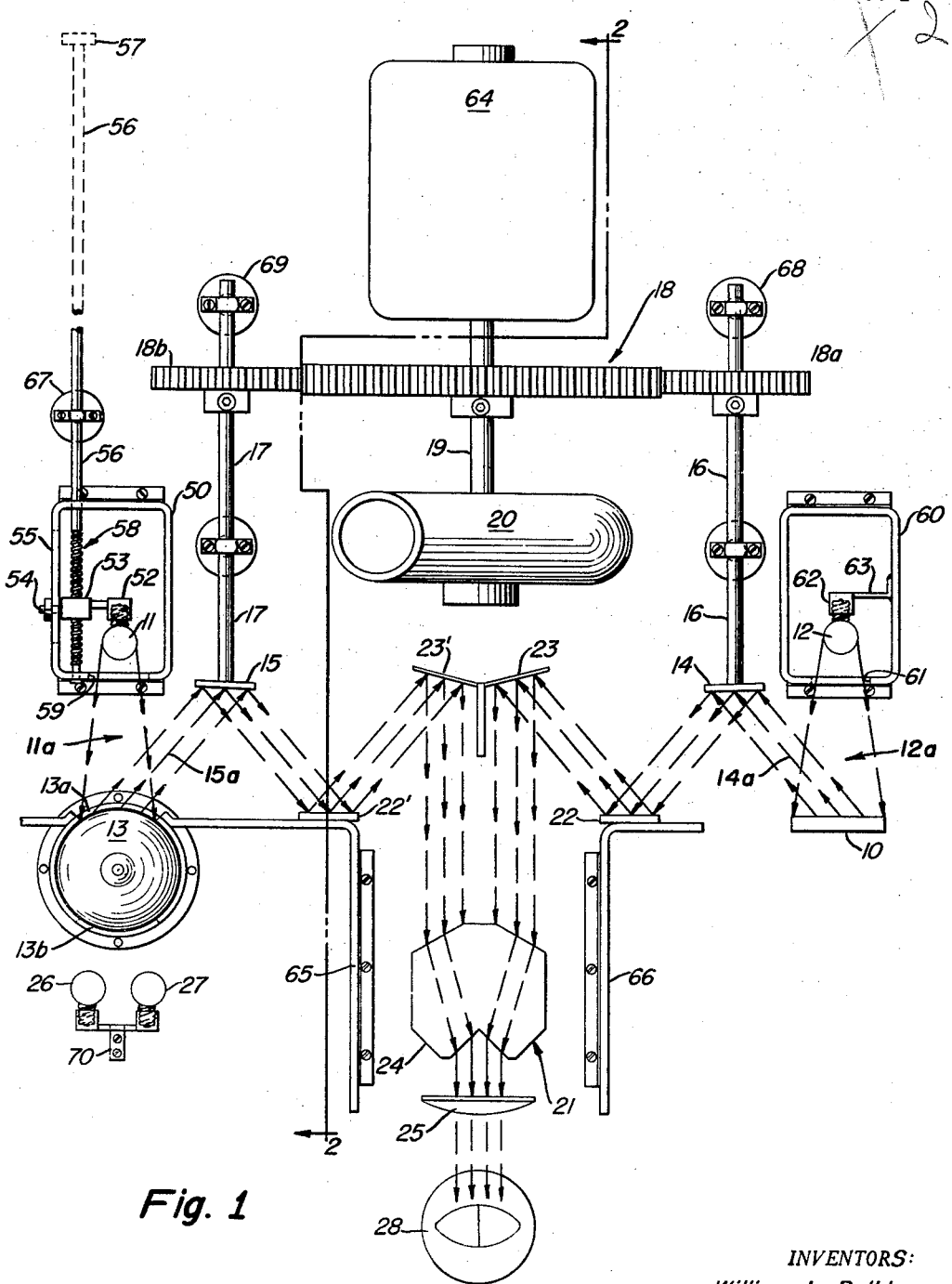
Figure 1 is a schematic illustration showing the paths of light from the standard and sample, respectively, and diagrammatically showing the elements of our apparatus.
Figure 2:
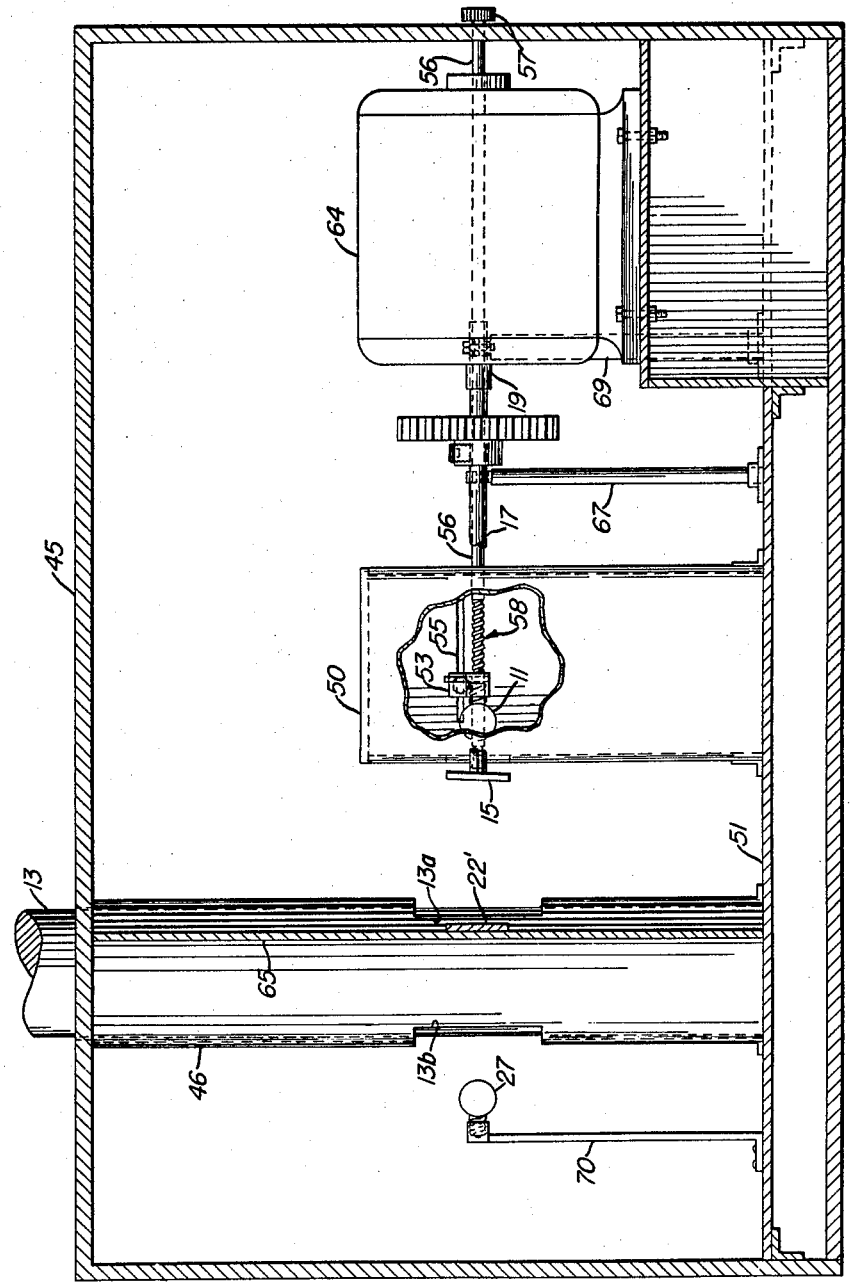
Figure 2 is a schematic elevation taken along the line 2—2 in Figure 1.

Referring to Figure 1, light source 11 is adjusted to the same intensity of illumination on the surfaces of the color standard disc 10 and the sample 13. The housing 50, which is fixed to the base 51 of the apparatus, encloses the light source 11 carried by a socket 52 which is fixed to a traveling block 53. A pin 54 extending from the block 53 is guided by slot 55 in the housing 50. The traveling block 53 is internally threaded to accommodate the adjusting shaft 56. The shaft 56 is rotatably fixed at one end to the housing 50 and the other end of the shaft 56 terminates in adjusting knob 57 exterior of the apparatus. By turning the knob 57, the shaft 56, and hence the threaded portion or worm 58, is rotated causing the traveling block 53 to move forward or rearward as the case may be. This adjusts the position of light source 11 with respect to the window 59 and sample 13.

Light source 12 is likewise disposed within a light housing 60 having a window 61. However, the light source 12 is not necessarily adjustable and in the illustrated embodiment it is supported by socket 62 and bracket 63 which is fixed to a side wall of the housing 60.

Circular mirrors 14 and 15 are fixed to rotate with shafts 16 and 17 and are arranged in such a manner than the viewing surface of each mirror 14 and 15 is nearly, but not quite, at right angles with the center line of the shafts 16 and 17. The shafts 16 and 17 supporting the mirrors 14 and 15, respectively, are driven by a motor 64 through a suitable drive gear 18 and driven gears 18a and 18b from the drive shaft 19. An extension of shaft 19 drives a small fan or blower 20.

Reflected light from the color disc 10 will be incident upon the mirror 14 from which it will be reflected onto fixed mirrors 22 and 23 from which the light travels through the double prism 24 and the lens 25. An optical sysem 21 is so arranged that the rotated mirrors 14 and 15 may be viewed simultaneously.

Due to the unique mounting and the rotating action of mirror 14, the various color sectors will form a blended image when viewed through the optical system 21. In a similar manner, the mirror 15 will produce a blended image of the portion of the sample 13 exposed by window 13a. All candles are somewhat translucent and, therefore, the correct amount of back lighting must be provided by light sources 26 and 27. Light baffles 65 and 66 support the fixed mirrors 22 and 22' and confine the back lighting to the sample 13, the illumination from sources 26 and 27 passing through window 13b.

In the preferred form of this invention, light sources 11 and 12 are so placed as to provide illumination beams 11a and 12a essentially normal to the surfaces of the candle 13 and color standard 10. Similarly, the rotating mirrors 14 and 15 are so positioned that the path of of light passing through the optical system leaves the surfaces of the candle 13 and color standard 10 as reflected rays 15a and 14a at an angle of approximately 45° with the normal. While the combination of mirrors in the optical system can be variously placed to achieve this relationship, the simplest arrangement is shown in Figure 1 wherein the viewed surfaces of the candle 13 and color standard 10 and the reflecting surfaces of the fixed mirrors 22 and 22' are in a single plane. The midpoints of the reflecting surfaces of rotating mirrors 14 and 15 and of fixed mirrors 23 and 23' are in a plane parallel to the first plane, and the mid-points of all mirrors and both viewed surfaces are in a plane normal to the two parallel planes. In such an arrangement, the center line of shaft 16 would be normal to said parallel planes and pass midway between the center of the viewed color standard 10 and the center of the fixed mirror 22.

The center line of shaft 17 would be parallel to that of shaft 16 and lie midway between the center of the viewed area on the candle and the center of fixed mirror 22'. The angle at which mirror 14 is positioned with respect to the center line of shaft 16 causes the area on color standard 10 "viewed" by mirror 14 to move along a circular path as mirror 14 is rotated by shaft 16, thereby to sweep an annular path over the several color segments of which standard 10 is composed. If the diameter of the circle through which the mid-point of this circular path passes is denoted by the symbol, $x$, and the vertical distance between the center of the color standard 10 and the prolongation of the center line of shaft 16 is denoted by the symbol, $y$, then the acute angle, $\theta$, between the plane of mirror 14 and the center line of shaft 16 is given by the relationship, $$\theta = 112\frac{1}{2}° - \frac{1}{2} \arctan\left(1 + \frac{x}{2y}\right)$$

The angle at which mirror 15 is placed with respect to the center line of shaft 17 can be expressed by a similar relationship. In this case, however, the diameter of the path "viewed" by the rotating mirror 15 is made very small so as to require a minimum of candle surface to be seen consistent with the objective of blurring or blending the viewed surface into a single color sensation without effects of surface texture or imperfections. While the preferred and simplest arrangement of the several mirrors and viewed surfaces has been set forth, it is obvious to one skilled in the art that other spacial and angular arrangements can be employed to attain the same objectives within the spirit of this invention.

The double prism 24 brings the two light paths together, the image being magnified slightly by lens 25 and appearing as the image shown in Figure 1. As seen by the eye, the resulting image is an optical field with the candle color occupying one-half and the blended color standard occupying the other half. The two colors can be compared instantly and accurately as they appear adjacent in the image.

In order to bring the two color fields, as viewed through the eye piece, into juxtaposition and thereby in a more accurate position, the eye piece has a single lens opening 28. The double prism 24 is arranged so that by looking through the lens opening 28, the blended standard and the blended sample will appear as a single optical image as described above. The use of such an optical system 21 makes possible an accurate comparison of the translucent sample 13 and the opaque standard 10. However, systems of this general type are commercially available and since the invention does not reside in its specific construction it will not be dsceribed in further detail.

In use, the observer would vary the exposed area of the disc sectors (Figures 3 and 4) until no color difference is discernible between the color disc and candle images. The relative amounts of each exposed color when the balance is observed may be transformed to a standard color notation.

One means for adjusting the amount of exposed color is shown in Figures 3 and 4. Mounted on shaft 29 are color discs 30, 31, 32, 33 and 34. Disc 30 is of one hue and solidly fixed to the shaft 29. The discs 31, 32 and 33 are shaped as sectors of a circle with a gear tooth rim 35 and mounted free to rotate on shaft 29. Disc 34 is a semi-circular segment of the same hue as disc 30. Gears 36 and 37 on shafts 38 and 39 engage respectively the gear tooth rims 34 and 31, and the amount of exposed color as viewed in Figure 4 is adjusted by turning the control knobs 40, 41, 42 and 43. Thickness of the several color discs is exaggerated in Figure 4 to illustrate construction. In use, these are kept as thin as possible to achieve nearly uniform illumination.

Mechanical blending of color chips as described herein permits distinguishing color differences which are less than half the amount between chips in the Color Harmony Manual of the Container Corporation of America. In addition, it has been found possible to blend pure hues so that seven hues, black and white can be used according to our invention to cover the complete Ostwald Color System. The relative areas of the sectors may be adjusted during the operation of the instrument by turning the control knobs 40, 41, 42 and 43 on the face of the housing 44 and thereby to define precisely the color of the object being tested.

The rotating mirror 14 achieves this blending of the sectors by causing the "viewed" area to sweep around the color standard at such a speed that the normal eye cannot perceive the individual color sectors but receives only the single sensation of the color areas blended in proportion to the areas exposed. Shaft 16 thus is rotated at a speed in the order of 2000 r.p.m. or higher, which speed we have found will cause the "viewed" area to circumscribe the face of the color standard in less than response time of the eye and produce a single color sensation irrespective of the relative area occupied by any one color on the standard 10.

While the use of seven pure hues plus black and white permits complete coverage of the Ostwald Color System by this mechanical blending method, a single combination of two pure hues plus black and white covers only the portion of the complete color system bounded by the hues selected. To facilitate changing to other areas in said system, duplicate containers similar to housing 44 are provided with color discs of hues appropriate to the other areas in said system it is desired to cover. Adapting the instrument to other color areas is accomplished by exchanging said containers which are held in housing 45 by a snap catch or the like. The relatively few such containers permit coverage of all color areas desired whereas an extremely large number of color discs would be required to achieve even step-wise coverage of these areas were the principle of color blending not employed.

The components of this system, as illustrated in Figures 1, 3 and 4, may be arranged in a suitable light-proof housing 45 as shown in Figure 5. The opening 46 is to accommodate the candle sample. The switch 47 will vary the back lighting by light sources 26 and 27 and switch 48 controls the front lights 11 and 12 and line 49 to the power source. The fan or blower 20 is used to circulate air through the housing 45 and prevent overheating of the candle. This blower 20 is preferably installed to induce room air into the candle aperture 46 thence through the instrument housing 45 and to exhaust it to the room. By this means, the coolest air circulates past the candle 13.

Although our invention has been described with reference to particular embodiments thereof which have been set forth in considerable detail, it should be understood that this is by way of illustration only and that the invention is not necessarily limited thereto. Likewise, the instrument can be applied to operations other than candle manufacture. Accordingly, alternative embodiments of the apparatus and modifications in the operating technique will become apparent to those skilled in the art in view of our description and such can be made without departing from the spirit of the described invention.

What we claim is:

1. A color comparator for colorimetric inspection of a translucent body which comprises holder means for such body, a laterally spaced adjustable color standard, said body and said standard being arranged in a common plane, light source means for directing beams onto said sample and onto said standard, said color standard comprising a plurality of overlying sectors of different hues, said sectors being adjustable and together comprising a variable multi-hued standard having a non-planar surface, a pair of eccentrically rotated similar mirrors adapted to intercept diffuse light equidistant and equiangularly from said sample and from said multi-hued standard, drive shaft means for each of said mirrors, said mirrors being mounted obliquely transverse to the axis of said drive shaft means whereby upon rotation of the shafts the reflecting surfaces of the mirrors are caused to "wobble" and thereby to scan the surface of the sample and to scan the exposed adjustable opaque color standard to produce a blended color sensation from each which is substantially unaffected by the surface variations thereof, and a symmetrical optical system adapted to produce a split image of said color standard and of said sample in juxtaposition.

2. In a color comparator for colorimetric inspection of a translucent body the apparatus which comprises an open-topped tubular chamber adapted to receive and removably retain a translucent body the color of which is to be determined, aligned window means on opposite sides of said tubular chamber, an opaque color standard disposed laterally from one of said aligned windows, first light means illuminating the front surface of such body exposed by said window means, second light means illuminating the surface of said opaque standard, said first and second light means being of substantially the same intensity and each directing a beam substantially normal to a plane including the color standard and the exposed surface of the body, a pair of rotating mirrors arranged to scan individually said exposed front surface and said opaque color standard, said mirrors being mounted in a plane non-parallel to said first plane and one of said mirrors reflecting an image of the standard and the other an image of the body to an optical system, whereby said rotating mirrors blend the image of the standard and of the translucent body respectively said optical system including a viewing means adapted to bring both of said color sandard and body images within a single visual field for comparison.

3. The comparator of claim 2 which includes a color standard comprising a plurality of separate color sectors and includes a drive means for simultaneously rotating said mirrors.

4. A color comparator comprising a holder means for a sample to be compared, an opaque color standard, said sample and standard being disposed in substantially the same plane and spaced from each other, a first light source directing a light beam on said standard substantially normal to said plane, a second light source directing a light beam on said sample substantially normal to said plane, a pair of eccentrically rotatable mirrors disposed between said standard and said sample and adapted to receive reflected light from said standard and from said sample at about 45° to the said plane, an optical system adapted to receive the reflected images from said mirrors and bring both of said color standard and sample images within a single visual field to produce images of the blended color standard and of the sample surface in juxtaposition for comparison, said mirrors being mounted on rotatable shafts having axes of rotation normal to said plane.

5. A colorimeter adapted to compare the color of a translucent substance illuminated by both reflected light and transmitted light with the color of a color standard which comprises a variable color standard having a plurality of adjustable color sectors, first light means illuminating said translucent substance with said both reflected light and transmitted light, a first nutating mirror arranged to scan a portion of said translucent substance thus illuminated and thereby eliminate the effect of surface variations on the color, second light means illuminating said variable color standard, a second nutating mirror arranged to scan the said variable color standard and thereby blend the colors thereof to give a single color sensation from said standard, each of said nutating mirrors being fixed obliquely transverse to a rotatable shaft, and an optical system to receive the images from said first and said second mirrors and bring the blended images of said color standard and the image of said sample within a single visual field to produce two juxtaposed images for comparison.

References Cited in the file of this patent

UNITED STATES PATENTS

| | | |
|---|---|---|
| 1,384,513 | Busby | July 12, 1921 |
| 1,924,747 | Nickerson | Aug. 29, 1933 |
| 2,054,195 | Forrest et al. | Sept. 15, 1936 |
| 2,221,916 | Forrest et al. | Nov. 19, 1940 |
| 2,597,658 | Mattucci | May 20, 1952 |
| 2,606,373 | Lamberger | Aug. 12, 1952 |
| 2,684,010 | Bulkley | July 20, 1954 |
| 2,758,502 | Scott et al. | Aug. 14, 1956 |

OTHER REFERENCES

"A Colorimeter for Use With Disc Mixture" (Nickerson), Journal of the Optical Society of America, vol. 21, No. 10, Oct. 1931, pages 640–42.

Bausch and Lomb HSB Color Analyzer (Instruction Manual), 1934, pages 1, 2 and 3 and the plate with 3 figures preceding page 1 are relied on.